(12) United States Patent
Sok et al.

(10) Patent No.: US 11,715,973 B2
(45) Date of Patent: Aug. 1, 2023

(54) DUAL OUTPUT UNINTERRUPTIBLE POWER SUPPLY

(71) Applicant: Microsoft Technology Licensing, LLC, Redmond, WA (US)

(72) Inventors: Banha Sok, Kirkland, WA (US); Rameez K. Kazi, Bellevue, WA (US); Shaun L. Harris, Redmond, WA (US); John J. Siegler, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

(21) Appl. No.: 16/675,213

(22) Filed: Nov. 5, 2019

(65) Prior Publication Data

US 2021/0135487 A1  May 6, 2021

(51) Int. Cl.
*H02J 9/06* (2006.01)
*G06F 1/30* (2006.01)

(52) U.S. Cl.
CPC ............... *H02J 9/062* (2013.01); *G06F 1/30* (2013.01); *H02J 9/068* (2020.01)

(58) Field of Classification Search
CPC ........ H02J 9/062; H02J 9/068; H02J 2310/16; H02J 9/061; G06F 1/30
USPC .......................................................... 307/66
See application file for complete search history.

(56) References Cited

U.S. PATENT DOCUMENTS

| | | | |
|---|---|---|---|
| 5,994,795 A * | 11/1999 | Gabillet | H02J 9/062 307/26 |
| 9,148,068 B2 | 9/2015 | Sarti | |
| 9,379,614 B2 | 6/2016 | Meinecke et al. | |
| 9,680,333 B1 | 6/2017 | Brooks et al. | |
| 9,859,749 B2 | 1/2018 | Nommensen et al. | |
| 10,238,000 B2 | 3/2019 | Sarti | |
| 10,396,560 B2 | 8/2019 | Svedendahl | |
| 2004/0155527 A1 * | 8/2004 | Bryde | H02J 9/061 307/64 |
| 2007/0278860 A1 * | 12/2007 | Krieger | H02J 9/061 307/64 |
| 2016/0285267 A1 * | 9/2016 | Stone | G06F 1/3203 |
| 2016/0372971 A1 * | 12/2016 | Budde | H02M 1/12 |
| 2017/0047772 A1 * | 2/2017 | Wang | H05K 7/1492 |
| 2018/0116070 A1 * | 4/2018 | Broadbent | G06F 1/30 |

(Continued)

FOREIGN PATENT DOCUMENTS

| | | |
|---|---|---|
| EP | 2919350 A1 | 9/2015 |
| EP | 2975726 A1 | 1/2016 |

OTHER PUBLICATIONS

"International Search Report and Written Opinion Issued in PCT Application No. PCT/US20/057269", dated Feb. 17, 2021, 11 Pages.

*Primary Examiner* — Toan T Vu
(74) *Attorney, Agent, or Firm* — Barta, Jones & Foley, PLLC

(57) ABSTRACT

An uninterruptible power supply (UPS) includes a rectifier configured to receive alternating current (AC) power. The UPS further includes a first output connected to the rectifier through an inverter. The first output is configured to output an AC power supply. The UPS also includes a second output connected to the rectifier through a battery backup and a stepdown converter. The second output is configured to output a direct current (DC) power supply in response to a detected power anomaly condition, thereby providing extra redundancy that allows for increased power availability and uptime.

20 Claims, 7 Drawing Sheets

(56) References Cited

U.S. PATENT DOCUMENTS

2019/0074668 A1     3/2019   Huang
2020/0144956 A1*   5/2020   Zhang .................... H02S 50/00

* cited by examiner

DUAL OUTPUT UNINTERRUPTIBLE POWER SUPPLY

BACKGROUND

In certain environments, a number of computing devices operate together at a particular location to provide a service, such as data centers or server farms providing services over the Internet. It is desirable to have a constant source of power at such locations so that the computers and other devices operating at that location continue functioning. Providing a constant source of power, however, can be difficult because power providers occasionally experience power outages or other power failures occur. As such, a backup power supply to protect against such a power outage is beneficial.

Backup power can be provided by an uninterruptible power source or uninterruptible power supply (UPS). The UPS provides emergency power to a load (such as the computing devices) when the input power source or main power fails. The UPS provides near-instantaneous protection from input power interruptions, by supplying energy stored, for example, in batteries.

In a standard Information Technology (IT) equipment rack in a data center, AC power goes into the UPS, which outputs AC to a power distribution unit (PDU) to be distributed to all the power supply units (PSUs) in the rack. In recent years, power supply arrangements have been configured in a power shelf infrastructure. The power shelf is a rackmount system used in data center racks designed to provide power rectification, system management and power distribution. However, current power shelf architectures sometimes do provide power backup redundancy that ensures a long enough power supply during a power failure, which would be beneficial to ensure constant power (at least for a short time period), such as to critical IT equipment in the data center during the power failure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An uninterruptible power supply (UPS) comprises a rectifier configured to receive alternating current (AC) power. The UPS further comprises a first output connected to the rectifier through an inverter. The first output is configured to output an AC power supply. The UPS also comprises a second output connected to the rectifier through a battery backup and a stepdown converter. The second output is configured to output a direct current (DC) power supply in response to a detected power anomaly condition.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The systems and methods described herein are configured to provide a dual output UPS that has extra redundancy. In one implementation, a multi-mode system UPS includes two outputs to accommodate different power outage conditions and can sustain a power outage for a time period (e.g., five minutes) to allow, for example, critical operations to be performed before system shutdown, switchover, etc. The UPS is operable in different modes, including a high efficiency mode and double conversion mode (input instability), In some examples, an alternating current/direct current (AC/DC) dual output UPS is configured for operation in a power shelf rack. In one particular implementation, redundancy is provided such that the system does not rely solely on the power shelf to supply power (e.g., 12V power), but the UPS is also able to provide 12V power in the case of power anomalies (e.g., power outage to the power shelf). As a result, power availability/uptime is increased. Thus, an additional redundancy is thereby provided.

Figure 1:
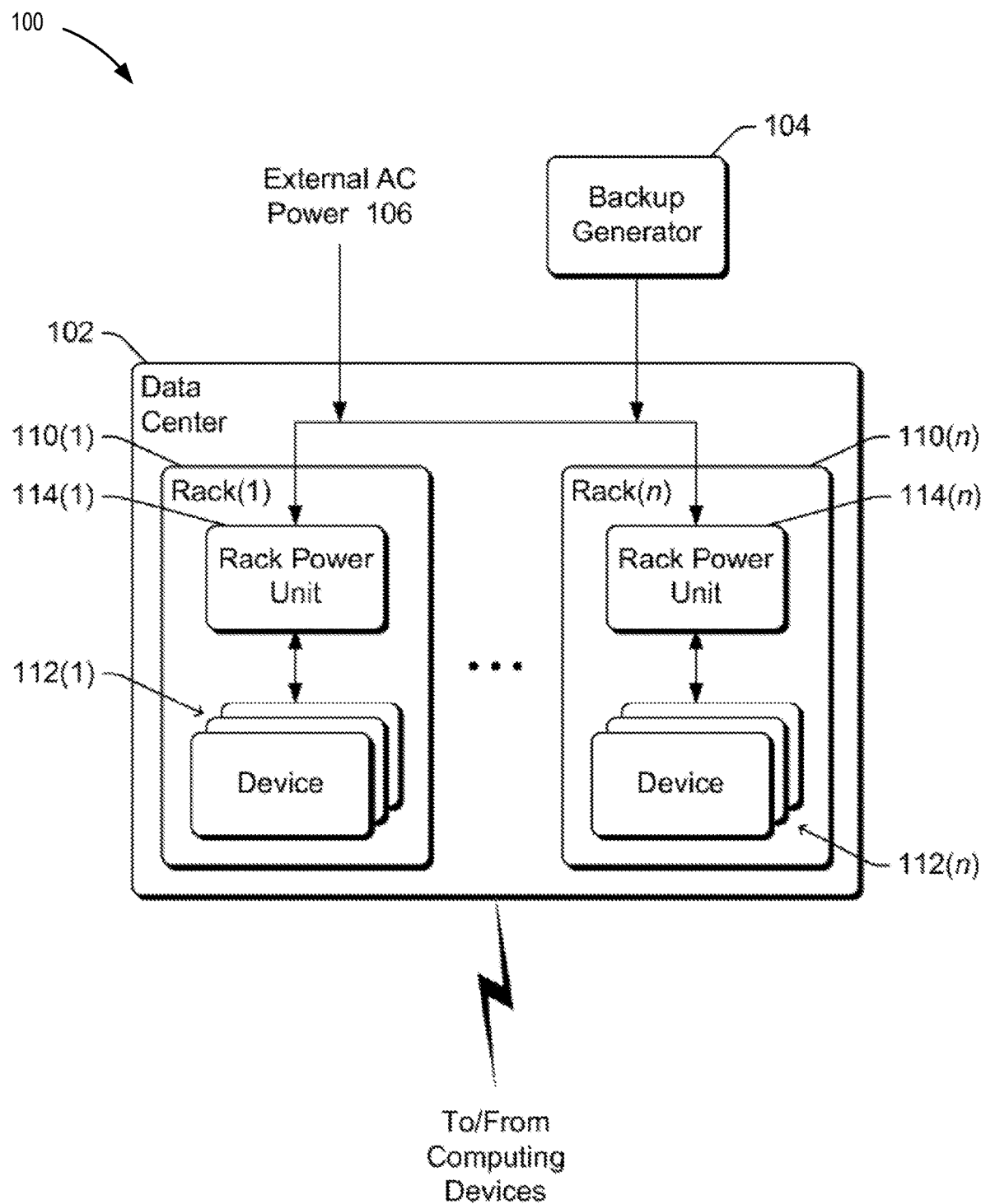
FIG. 1 is a block diagram illustrating a system having a UPS according to an embodiment.

FIG. 1 illustrates an example system 100 implementing a rack-based UPS in accordance with one or more implementations. In one particular example, a multi-mode UPS includes a first output and a second output. The multi-mode UPS may be configured for operation in a data center, such as a 17 KW UPS operable in a high efficiency mode and double conversion mode (input instability), as well as configured to sustain a power outage for a period of time.

More particularly, and continuing with the data center example, the data center includes multiple computing devices and optionally other networking devices that are located within a device rack. AC power is provided to the data center from an external power source, and also from a backup generator in the event of a loss of power from the external power source. Additionally, each device rack has a rack power unit that receives the AC power and converts the AC power to DC power, which in turn is provided to the devices located within that device rack. Each rack power unit also includes one or more batteries or battery packs that provide power to the devices within that rack during a time period between the loss of power from the external AC power source and, for example, the backup generator becoming operational and providing AC power to the data center. Each rack power unit can also provide additional functionality. For example, the UPS is operable to output the AC output to the power shelf while switching off the second output. In the case of a power anomaly condition, the second output provides a source of DC power to a bus bar that can be current shared with the power shelf output or operate alone as discussed herein.

With particular reference to the configuration illustrated in FIG. 1, the system 100 includes a data center 102, a backup generator 104, and external AC power 106 received from an external power source. The data center 102 includes one or more (n) device racks 110(1), . . . , 110(n), each including one or more devices 112 and a rack power unit 114. The device racks 110 are also referred to herein as racks. It should be noted that although reference is made herein to device racks, the devices 112 and power units 114 can alternatively be grouped into other containers, mounting units, or other grouping configurations. In such configurations, the rack-based UPS techniques discussed herein can be implemented based on such alternate groupings rather than based on a rack.

The data center 102 operates to provide one or more services to various computing devices. The computing devices can be located in close physical proximity to the data center 102, and/or located across a wide geographic range (e.g., throughout a country or throughout the world). The data center 102 communicates with the computing devices via a variety of different networks, including the Internet, a local area network (LAN), a cellular or other phone network, an intranet, other public and/or proprietary networks, combinations thereof, and so forth. The data center 102 can be accessed by a variety of different types of computing devices, such as a desktop computer, a laptop computer, a mobile station, an entertainment appliance, a television, a set-top box communicatively coupled to a display device, a cellular or other wireless phone, a game console, an automotive computer, and so forth.

The data center 102 can provide one or more of a variety of different services to computing devices. In one example, the data center 102 provides one or more of a social networking service, an email service, a search service, an information resource/storage service, a messaging service, an image and/or video sharing service, a gaming or other entertainment service, and so forth. The one or more services provided by the data center 102 can be publicly available or alternatively access to one or more of the services can be restricted to particular users (e.g., those having a valid account as verified by a service of data center 102).

In the system 100, external AC power 106 is power received from one or more external power sources, such as a power station managed by a power utility company. The external AC power 106 is, for example, single-phase or 3-phase power. An interruption in external AC power 106 (also referred to as a power outage or power failure) can occur, and is a situation where the expected external AC power 106 is not received by the data center 102. A variety of causes exist for such an interruption, such as a failure at a power station that provides the power 106, a failure in a power transmission line between the power station and the data center 102, among others. In some examples, the interruption can occur as a result in a failure in a component of the system 100.

In the illustrated example, the backup generator 104 is a power generator that operates as a backup source of AC power in the event of an interruption in the external AC power 106. The backup generator 104 can be, for example, a diesel-powered or gas-powered generator. Although a single backup generator 104 is illustrated in the system 100, optionally multiple backup generators 104 (e.g., each responsible for providing AC power to one or more racks 110) can be included in system 100. The backup generator 104 can provide, for example, single-phase or 3-phase AC power, typically providing the same single-phase or 3-phase power as the external AC power 106. Alternatively, the backup generator 104 provides DC power rather than AC power.

The backup generator 104 in some examples is located in close physical proximity to the data center 102. In one example, a controller in the backup generator 104, or alternatively in another component or device, detects an interruption in the external AC power 106. In response to the detected interruption in the external AC power 106, the backup generator 104 is powered on and begins generating AC power to provide to the data center 102. Typically, there is a time period between the interruption in the external AC power 106 and the backup generator 104 generating sufficient AC power to power the data center 102 (at which point the backup generator 104 is referred to as being online). This time period can vary based on one or more of the manner in which the interruption of power is detected, the power used by the data center 102, and the particular backup generator 104. The rack power units 114 within the individual racks of data center 102 provide power to the devices 112 in the device racks 110 during this time period, as discussed in more detail below.

Multiple devices 112 in the data center 102 operate to provide the functionality of the one or more services provided by the data center 102. A variety of different types of devices can be included. The devices 112 include one or more server computers, such as rack servers or blade servers in one example. The devices 112 include one or more other components, such as a networking component (e.g., a gateway, a router, a switch), a data storage component (e.g., one or more magnetic disk drives), a cooling component (e.g., a fan), and so forth, in some examples.

The devices 112 are located within the racks 110 of the data center 102. The rack 110 is a physical structure or housing into which multiple chassis can be inserted, mounted, or otherwise placed. The rack 110 includes different physical locations where a chassis of a particular size (referred to as a rack unit or RU) can be placed. Different types of racks 110 can hold different numbers of chassis. In some examples, the rack 110 is configured to hold 50 chassis, 90 chassis, and so forth. The chassis in turn can house a variety of different components, such as the device 112 or the rack power unit 114. Each rack 110 includes one or more data buses, one or more control buses, and one or more power buses that allow data and control information to be communicated to and from the devices 112, and allow power to be communicated to devices 112.

It should be noted that the rack power unit 114 can take different configurations. In one example, the rack power unit 114 is configured in a power shelf configuration (as described in more detail herein in connection with FIGS. 3 and 4) that allows for hot-swap insertion to allow power module exchange under live power operation. However, the present disclosure can be implemented in different configurations. For example, the rack power unit 114 can be configured such that AC power is provided to a power distribution unit (PDU) that is then distributed to one or more power supply units (PSUs) in the rack 110.

In one example, each rack 110 includes one or more of the rack power units 114. Each rack power unit 114 receives AC power, which can be the external AC power 106 or AC power from the backup generator 104. Each rack power unit 114 converts the received AC power into DC power, and provides the DC power to the devices 112 within the same rack as that rack power unit. For example, the rack power unit 114(1) provides DC power to devices 112(1) in rack 110(1), but does not provide DC power to devices 112(n) in other racks (n). Additionally, although each rack 110 is illustrated in FIG. 1 as including one rack power unit 114, alternatively a rack 110 can include two or more rack power units 114 that each provide DC power to devices within the same rack as the two or more rack power units.

Although the rack power units 114 are illustrated as receiving AC power, in other examples, the rack power units 114 receive a DC power input. In such examples, rather than (or in addition to) converting received AC power into DC power, the rack power units convert received DC power to a desired voltage (e.g., as desired for a DC power bus within the rack 110).

Each rack power unit 114 also includes one or more batteries or battery packs and operates as a UPS for devices 112 in the same rack as the rack power unit 114. In the event of an interruption in AC power received by the rack power unit 114, the rack power unit 114 draws power from the one or more battery packs to provide to the devices 112. Thus, if external AC power 106 is interrupted, the rack power unit 114 draws power from the one or more battery packs to provide power to the devices 112 until, for example, the backup generator 104 provides AC power to the rack power unit 114.

Figure 2:
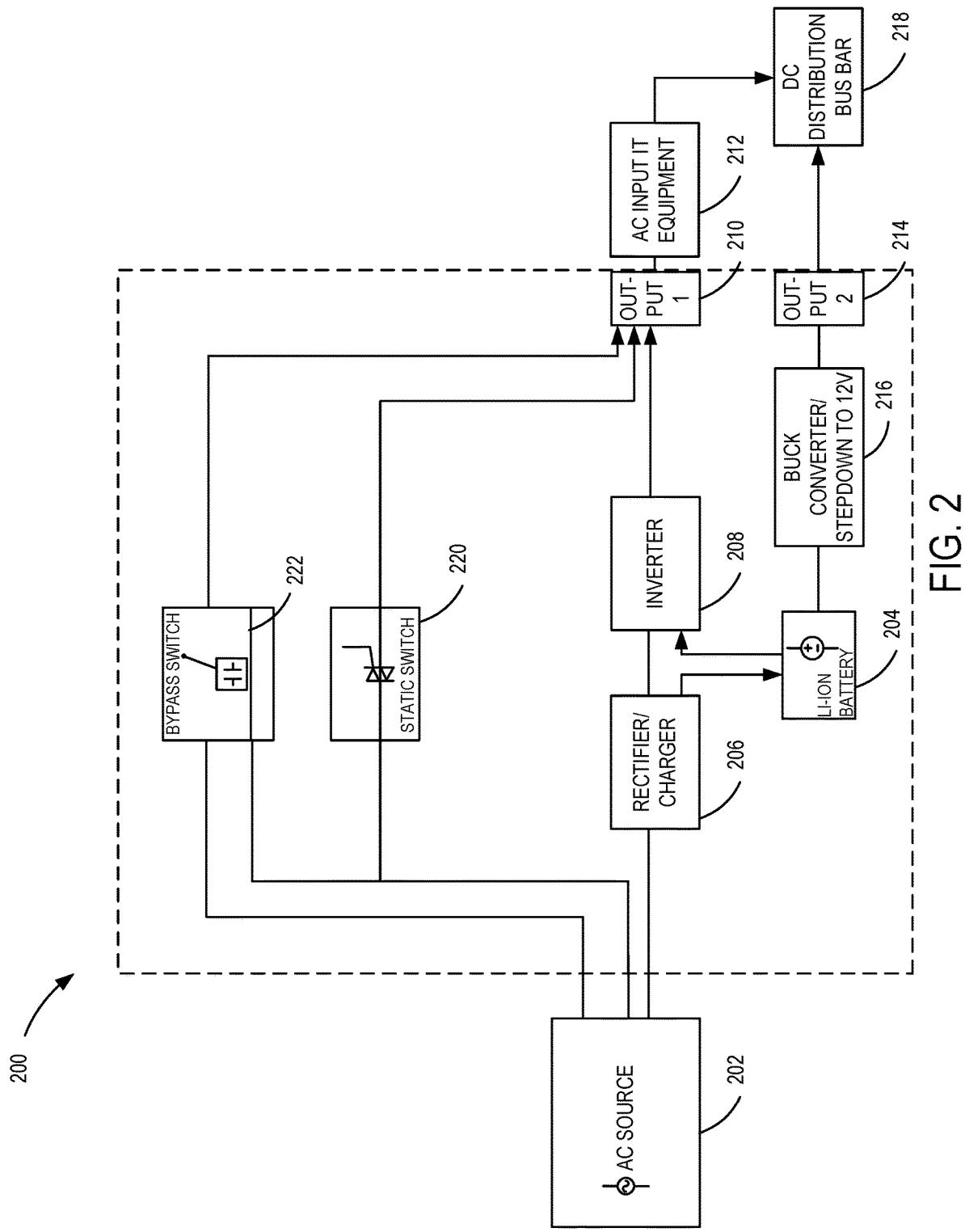
FIG. 2 is a schematic block diagram of a UPS according to an embodiment.

FIG. 2 is a block diagram illustrating an example UPS 200 in accordance with one example. The UPS 200 is an example of or can be embodied as the rack power unit 114 of FIG. 1. The UPS 200 receives AC power 202, which can be from a variety of sources, such as a power station, a backup generator, and so forth. Although illustrated as AC power, the power 202 can alternatively be DC power (e.g., from a backup generator providing DC power). As discussed herein, situations can arise where there is an interruption in the AC power 202 from one source (e.g., a power station), followed by a time period until the AC power 202 is provided by another source (e.g., a backup generator).

The UPS 200 includes one or more battery backups 204. The number of battery backups 204 in the UPS 200 can vary. For example, multiple battery backups 204 can be included in the UPS 200 for redundancy (e.g., in the event of a failure of one of the battery backups 204). In the illustrated example, a single battery backups 204 is shown and is a lithium-ion battery. However, different types of batteries can be used, such as sealed lead-acid batteries.

The UPS 200 includes an AC/DC converter, which is configured as a rectifier/charger 206 in the illustrated example. In operation, the rectifier/charger 206 converts AC power, which periodically changes direction, to DC power, which flows in only one direction. The output of the rectifier/charger 206 is connected to the battery backup 204 and converts the AC power 202 to DC power to charge the battery backup 204 in some examples. The output of the battery backup 204 is also connected to an inverter 208, which is configured as a power inverter is some examples. The inverter 208 converts the DC power from the rectifier/charger 206 back to AC power, which is then provided to a first output 210. That is, a normal flow double conversion power path is defined from the AC power 202 to the first output 210. Thus, the first output 210 supplies AC power, such as to AC input IT equipment 212. However, as should be appreciated, the first output 210 can provide AC power to any device capable of being powered by AC power.

The UPS 200 also includes a power path to a second output 214 that supplies DC power as an output. More particularly, the output of the battery backup 204 is connected to stepdown converter 216 (also referred to as a buck converter). In the illustrated example, the stepdown converter 216 converts the power supplied from the battery backup 204 to a defined lower level, which in this example is 12V. The stepdown converter 216 is a DC-to-DC power converter that steps down voltage (while stepping up current) from the input to the output thereof, in one example. In operation, this power path provides a stepped down DC power supply to the second output 214, which can be used to provide DC power to DC devices. In the illustrated example, the second output 214 is connected to a DC distribution bus bar 218, which provides DC power to various devices in the power rack, such as the rack 110 (shown in FIG. 1). It should be noted that in the illustrated example, the output of the AC input IT equipment 212 is also connected to the DC distribution bar 218.

Thus, in the illustrated configuration, received AC power 202 is converted to DC power, and the DC power is output from the second output 214, such that this power is provided to the devices in the same rack. It should be noted that the DC power can be any of a variety of different voltages, such as 12 volts, 24 volts, 48 volts, etc. and is provided to the devices in the same rack via the DC distribution bar 218. That is, each device in the same rack is coupled to the DC distribution bar 218. As such, rather than converting received AC power to DC power, each device in the rack receives DC power via the DC distribution bar 218.

It should be noted that the various components of the UPS 200 can be differently configured, such as based on the particular application, power requirements, etc. For example, the particular configuration of the battery backup 204, the rectifier/charger 206, the inverter 208, and the stepdown converter 216 can be varied to meet the requirements for a particular application.

In operation, the UPS 200 is thereby configured as a dual output power supply, namely having the first output 210 and the second output 214. The first output 210 of the dual output power supply is configured to provide AC output power that is powered through the rectifier/charger 206 (and to the battery backup 204) and then through the inverter 208. Additionally, the second output 214 of the dual output power supply is configured to provide DC output power through the rectifier/charger 206, to the power supply 204, and then to the stepdown converter 216. Thus, dual output UPS power that includes switchable AC output power and DC power provides extra redundancy in providing continuous power, including increased power availability and uptime.

In a normal operating state or condition, the UPS 200 is configured to output the AC output from the first output 210 to, for example the power shelf, while switching off the second output 214. In the case of a power anomaly situation, the second output 214 is configured to source DC power to the DC distribution bar 218 (configured as a bus bar) that is current shared with the power shelf output in one example, or not current shared and provides power alone in another example.

When input AC power instability occurs (e.g., detected by a power detection device), the power shelf operates in the double conversion mode (AC-to-DC-to-AC conversions) as discussed herein and is ready to source from the battery backup 204. In a situation wherein the power shelf fails, and power is needed for the AC input IT equipment 212 in the rack, the UPS 200 switches on (activates) the second output 214 and sources 12V DC power from the second output 214 until the power supply 214 is depleted or necessary shut down operations are completed (e.g., a non-volatile dual in-line memory (NVDIMM) module or other random-access memory save completes).

In a situation where the rack, such as the AC input IT equipment 212, is drawing more power than specified by the power cord for the rack (e.g., exceeding the rated power of the power cord), the UPS 200 enables a peak shaving mode to help with the output load. In this mode of operation, the second output 214 current shares with the 12V output of the power shelf.

The UPS 200 also includes a static switch 220 and a bypass switch 222 in some examples. These switches are configured to select different modes of operation. For example, the static switch 220 (e.g., a semiconductor switch) allows current flow therethrough in a normal power flow (high efficiency) mode of operation, and also prevents backflow of current. In this mode of operation, the AC power 202 is connected to the first output 210. The bypass switch 222 is switchable to select a bypass mode of operation, such as when performing maintenance operations on the UPS 200. That is, in the bypass mode, the power conversion components are bypassed.

It should be noted that the battery backup 204 in some examples is a plurality of battery packs that provide DC power to devices in the same rack via the DC distribution bar 218. In the rack-based UPS 200 discussed herein, the battery packs are placed in the same rack as (and thus in close physical proximity to) the devices being powered by the battery packs. This close physical proximity reduces (relative to environments in which the battery packs are further from the devices being powered) losses that can be incurred as power is transferred to the devices.

Furthermore, because power is distributed within the rack via the DC distribution bar 218, conversions between AC and DC power need not be performed when providing power from battery packs to the devices in the rack. Rather, the power is provided more efficiently because power losses that can be incurred when converting between AC and DC power are not experienced when providing power from the battery packs to the devices in the rack. No additional conversions between AC and DC power need be performed for the sole benefit of battery packs. That is, the battery packs are situated to receive DC power after the received AC power has been converted.

In one example, a rack-based uninterruptible power source is implemented using a single chassis, with the components included in that single chassis. Alternatively, one or more of the components can be implemented across multiple chassis, such as various components being implemented in one or more chassis. In some examples, the DC distribution bar 218 is configured as a power bus having multiple ports that are coupled to one or more computing devices powered by the UPS 200 (e.g., the DC distribution bar 218 can have multiple receptacles that are physically plugged into by the devices, or can have multiple cords and plugs that are plugged into receptacles of the devices). In one example, a power supply controller (e.g., the PDU) can manage the ports individually, allowing DC power to be turned on or turned off to a particular device as desired or needed and controlled by the power supply controller. The power supply controller can also monitor the power consumed at the power port, and can use the information obtained from this monitoring in different manners, such as determining an average power usage of the device (and thus of the rack), peak power usage of the device (and thus of the rack), and so forth.

Figure 4:
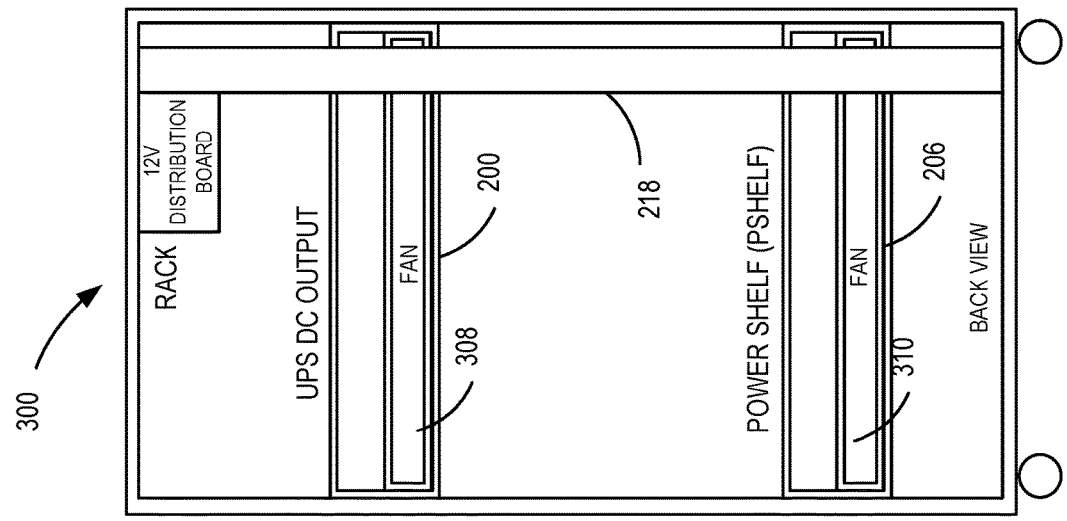
FIG. 4 is a block diagram illustrating a back view of the IT rack of FIG. 3.
Figure 3:
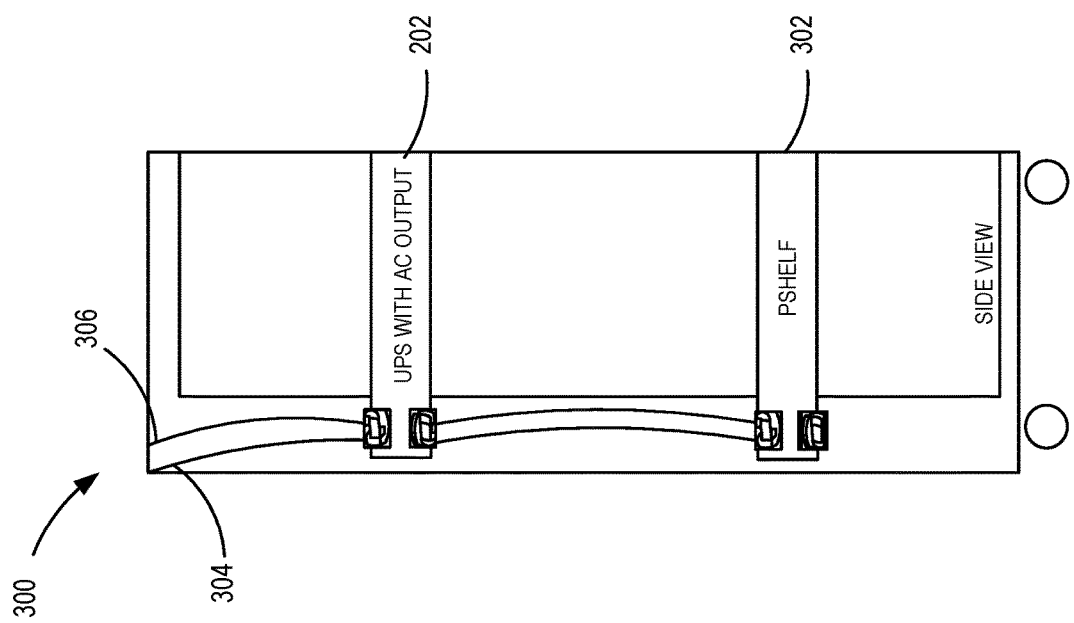
FIG. 3 is a block diagram illustrating a side view of an Internet Technology (IT) rack according to an embodiment.

One example of a rack 300 is shown in FIGS. 3 and 4. The rack 300 includes the UPS 200 and a power shelf (Pshelf) 302, which are configured to operate as described in more detail herein. That is, the UPS 200 is configured to provide extra redundancy in supplying power, such as to supply 12V power in case of power failure to the rack 300. As a result, power availability and uptime during a power failure event is extended.

In the illustrated example, the rack 300 is connected to two separate power supply lines 304 and 306 (Feed A and Feed B). In one particular implementation, the power supply line 304 is connected to and provides power from an external power source to the UPS 200 and the power supply line 306 is connected to and provides power from an external power source to the power shelf 302. As such, the rack 300 is protected from a single point of power failure. It should be noted that the UPS 200 and power shelf 302 also include additional components, such as fans 308 and 310 to cool these devices during operation.

As should be appreciated, the second output 214 (shown in FIG. 2) is connected to the DC distribution bus bar 218. It should also be appreciated that the rack 300, in some examples, includes a detection device that allows for the detection of output (e.g., droop output of the power shelf 302). This allows for a determination of a power supply failure condition or other power anomaly condition. In some examples, a manual activation element (e.g., button or switch) is provided to allow for switching between the different modes of operation discussed herein.

Thus, the present disclosure provides, for example, the UPS 200 having extra redundancy to critical IT equipment in the data center by using dual outputs. For example, in the event of failure of the power shelf 302, the UPS 200 activates the second output 214 and sources 12V power therefrom. Additionally, when rack equipment draws more power than a maximum rating, the UPS 200 is configured such that the second output 214 current shares with the 12V output of the power shelf 302. As such, the dual output UPS 200 provides redundancy in the rack 300 with the power shelf 302 during different anomaly or failure events, such as:

1. During input failure, the power shelf 302 runs on a double conversion mode and source power is provided from battery backup, such as the battery backup 204 in the UPS 200.

2. During power shelf failure, the UPS 200 activates the second output 214 to power, for example, IT equipment in the rack 300.

3. When the rack equipment is drawing excess power or more power than a rated level, the second output 214 of the UPS 200 current shares with the 12V power output of the power shelf 302.

Figure 5:
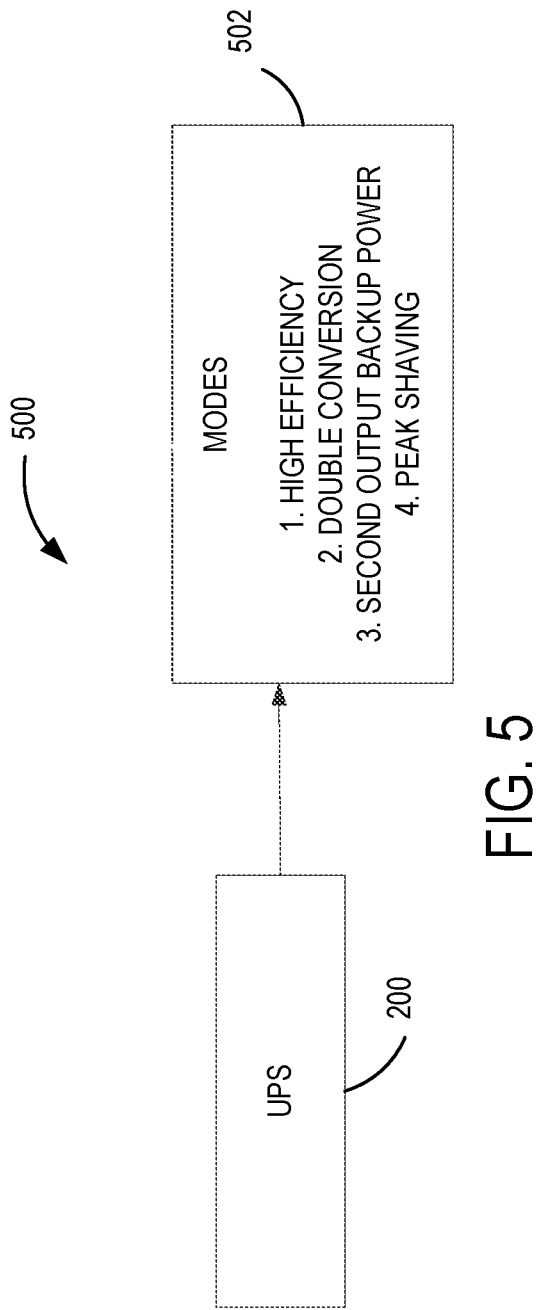
FIG. 5 illustrates multi-mode operation of a UPS according to an embodiment.

Various examples provide dual output UPS, such as the UPS 200 that is configured for multi-mode operation 500 as illustrated in FIG. 5. As discussed herein, the UPS 200 provides different sources of power depending on the particular operating condition (e.g., normal operation or anomaly operation) by operating in different modes 502. It should be appreciated that while FIG. 5 illustrates a plurality of defined modes 502, additional, fewer, or different modes of operation are contemplated.

In the illustrated example, four modes of operation are possible:
1. High efficiency mode of operation.
2. Double conversion mode of operation.
3. Second output backup power mode of operation (i.e., power output from the second output 214).
4. Peak shaving mode of operation.

These modes of operation are discussed in more detail herein and are possible as a result of the dual outputs of the UPS 200. The modes of operation allow for continuous power to be supplied during power anomaly conditions. As should be appreciated, at some point after the power outage occurs, providing of AC power resumes (whether from the external power source or from a backup generator). It should be noted that the point at which the power anomaly condition occurs (e.g., power failure) or the point at which AC power resumes (and thus the UPS ceases to provide power) can be identified in a variety of manners in the power failure detection technology area.

Figure 8:
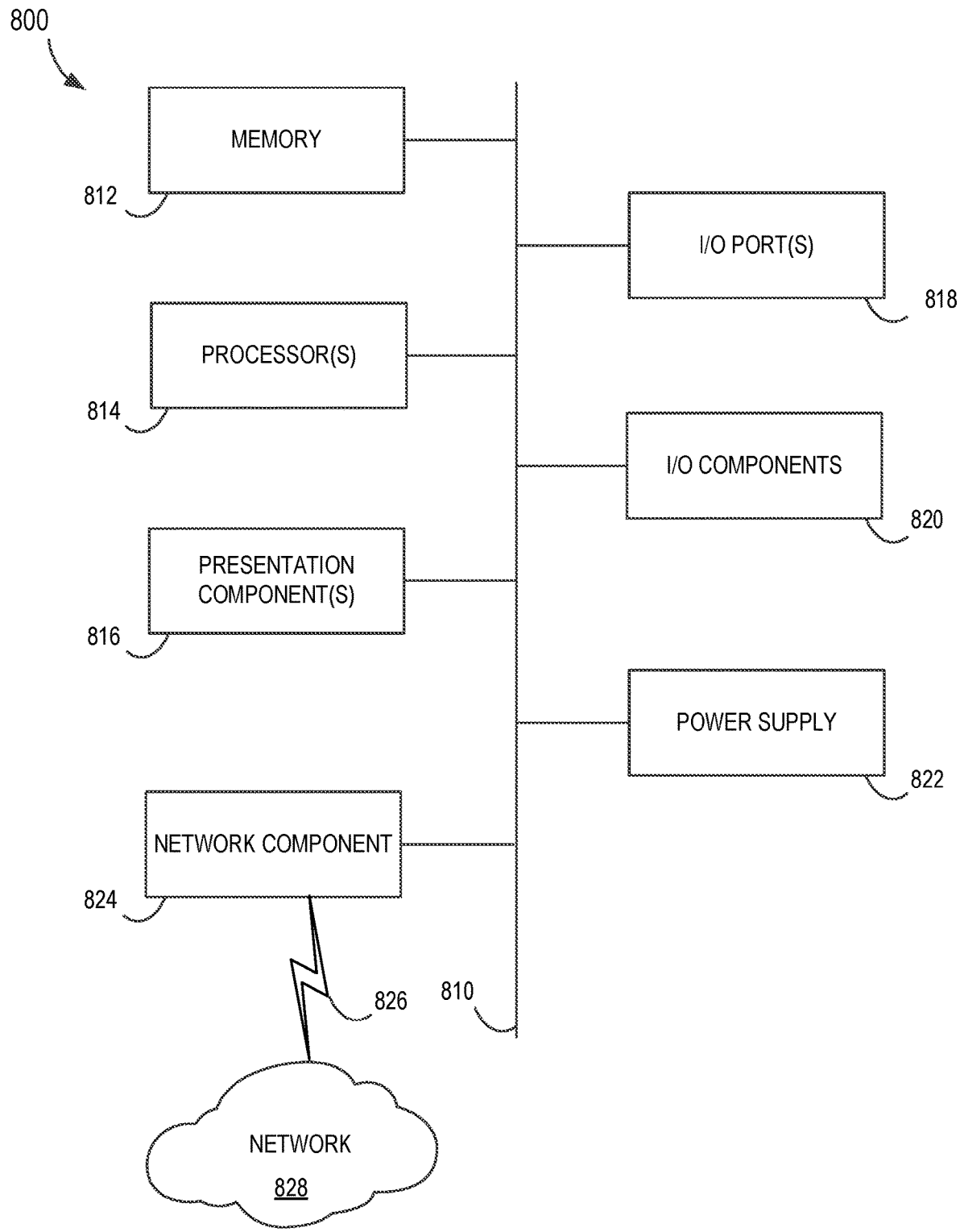
FIG. 8 is a block diagram of an example computing environment suitable for implementing some of the various examples disclosed herein.

It also should be appreciated that the output from various examples is useful for managing power supplied to a system 800, which is described in more detail in relation to FIG. 8.

Figure 6:
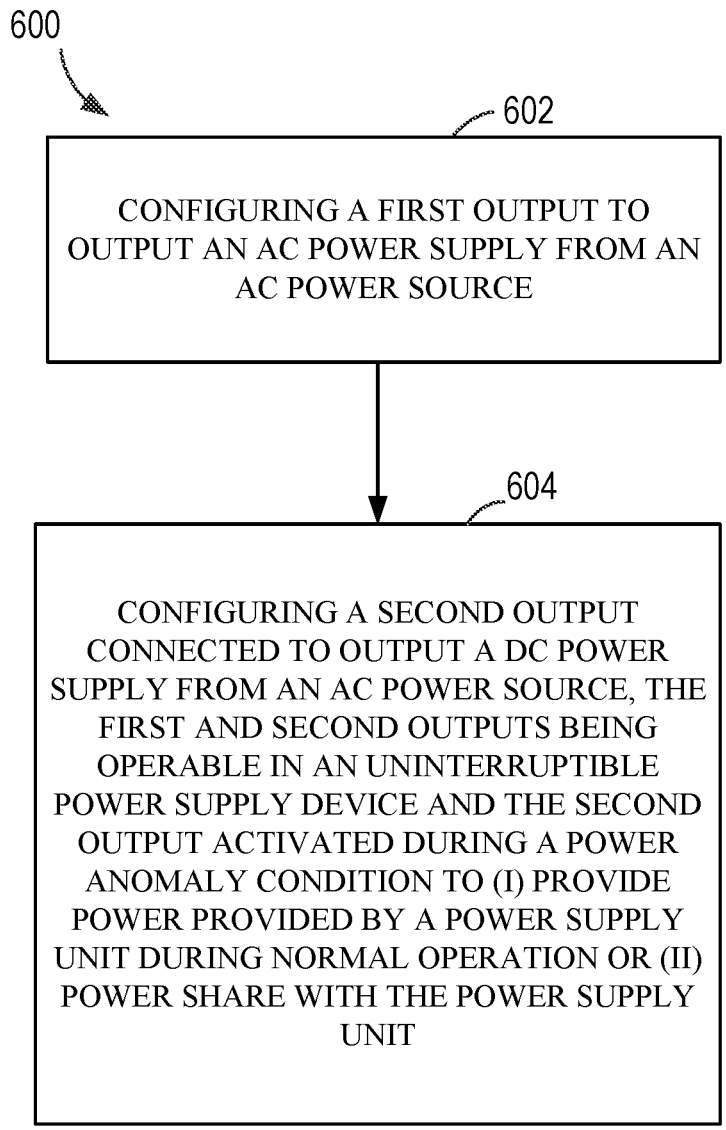
FIG. 6 is a flowchart of a process for providing a UPS according to an embodiment.

FIG. 6 is a flowchart illustrating exemplary operations involved in a method 600 for providing a UPS in accordance with various examples. By providing the UPS, power availability and uptime during a power anomaly condition can be increased. The operations illustrated in the flowchart described herein can be performed in a different order than is shown, can include additional or fewer steps and can be modified as desired or needed. Additionally, one or more operations can be performed simultaneously, concurrently or sequentially.

More particularly, and with reference also to FIGS. 1-5, the method 600 includes configuring a first output to output an AC power supply from an AC power source at 602. For example, as described herein, the UPS 200 is configured to output AC power at the first output 210. As such, during normal power conditions, the first output 210 provides AC power, for example, to AC input IT equipment.

The method 600 also includes configuring a second output to output a DC power supply from the AC power source at 604. For example, as described herein, the UPS is configured to output DC power at the second output 214. As such, during power anomaly conditions, the second output 214 provides power or current shares power to, for example, DC devices or components in a rack.

More particularly, at 604, the first and second outputs are operable in the UPS 200 such that the second output is activated during a power anomaly condition to (i) during a power failure, provide power from a battery backup unit or (ii) during an excess power condition, power share with the power supply unit. Thus, additional redundancy is provided by the method 600.

Figure 7:
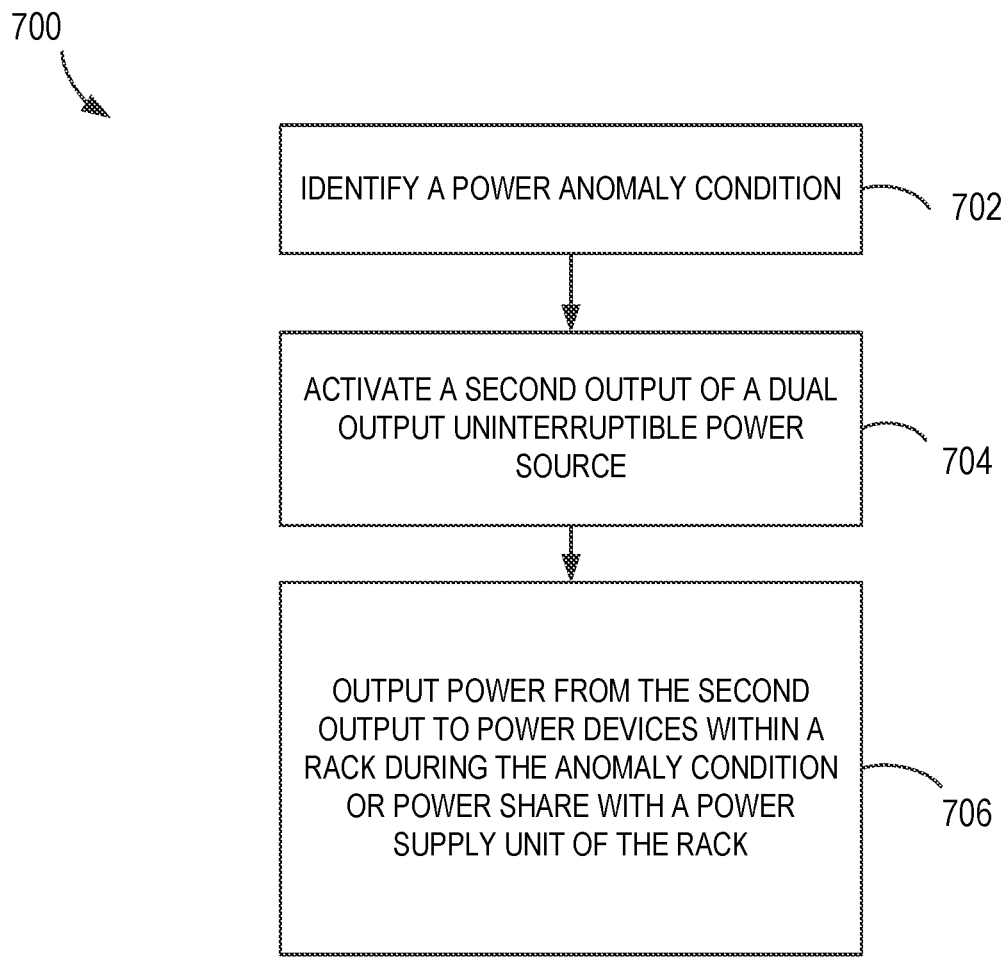
FIG. 7 is a flowchart of a process for providing power during power anomaly conditions according to an embodiment.

FIG. 7 is a flowchart illustrating exemplary operations involved in a method 700 for providing power during power anomaly conditions in accordance with various examples. By providing the power during these conditions, critical devices can, for example, be properly shut down by providing additional power for a time period after a power failure in a rack.

More particularly, and with reference also to FIGS. 1-6, the method 700 includes identifying a power anomaly condition at 702. For example, as described herein, the power anomaly conditions can include, but are not limited to, an input AC power instability, a power shelf failure, or equipment drawing an excess amount of power, among others. The power anomaly condition is detected in some examples by measuring electrical voltage or current, or other electrical characteristics at the input or output of one or more components in the rack, or at the input of the rack.

The method 700 also includes activating a second output of a dual output UPS at 704. For example, when the power anomaly condition is detected, and in response thereto, a DC output of the UPS (e.g., the second output 214 of the UPS 200) is activated (e.g., an AC output of the UPS is no longer providing power). For example, the second output is activated and allows 12V DC power to be provided to IT equipment in the rack until the battery backup is depleted or shut down operations are completed by the IT equipment.

The method 700 further includes outputting power from the second output at 706. For example, the DC output of the UPS outputs DC power to power devices within the rack when a power failure is detected or power shares with a power supply unit of the rack during excess power times.

It should be noted that some examples are configured as an add-on or modification kit to a multi-mode system UPS. That is, an existing UPS is modifiable according to the various examples described herein, including to perform the methods 600 and 700.

Thus, various examples provide a dual output UPS with additional operating modes and redundancy to facilitate providing power to equipment during power anomaly conditions.

Additional Examples

Some aspects and examples disclosed herein are directed to an uninterruptible power supply (UPS) comprising:
  a rectifier configured to receive alternating current (AC) power;
  a first output connected to the rectifier through an inverter, the first output configured to output an AC power supply; and
  a second output connected to the rectifier through a battery backup and a stepdown converter, the second output configured to output a direct current (DC) power supply in response to a detected power anomaly condition.

Additional aspects and examples disclosed herein are directed to a dual output uninterruptible power supply (UPS) comprising:
  a first output;
  a second output;
  an alternating current (AC)/direct current (DC) converter configured to convert input AC power to a DC power supplied to a battery backup;
  an inverter configured to convert the DC power to AC power to output at the first output; and
  a stepdown converter configured to step down the DC power to output at the second output.

Additional aspects and examples disclosed herein are directed to a method for providing an uninterruptible power supply (UPS), the method comprising:
  configuring a first output of the UPS to output an AC power supply from an AC power source; and
  configuring a second output of the UPS to output a DC power supply from an AC power source, the first and second outputs being selectively operable in the UPS and the second output activated during a power anomaly condition to (i) output power during the power anomaly condition that is provided by a power supply unit during normal operation or (ii) power share with a power supply unit.

Alternatively, or in addition to the other examples described herein, examples include any combination of the following:
  wherein the power anomaly condition comprises one of a power failure or an excess power condition.
  wherein the battery backup is connected between the rectifier and the inverter.

wherein the UPS is coupled within a rack and further comprising a power supply unit coupled within the rack, wherein the first output is connected to AC powered equipment in the rack and the second output is connected to a DC distribution bus bar, and the DC power supply is sourced to the DC distribution bus bar as a current shared power source with an output of the power supply unit during the power anomaly condition.

further comprising a first power supply line connected to the UPS and a second power supply line connected to the power supply unit.

wherein the first output is configured to operate in a high efficiency mode or a double conversion mode.

wherein the second output is activated in response to a power anomaly condition.

wherein the second output is in an active state until one or more shut down operations of connected devices having random-access memory are completed.

wherein the first output is configured to operate in modes of operation that are different than modes of operation of the second output.

wherein the first and second output are configured for selectable operation in a plurality of operating modes comprising a high efficiency mode of operation, a double conversion mode of operation, a second output backup power mode of operation, and a peak shaving mode of operation.

configuring the first and second outputs to selectively operate in a plurality of operating modes comprising a high efficiency mode of operation, a double conversion mode of operation, a second output backup power mode of operation, and a peak shaving mode of operation.

configuring an alternating current (AC)/direct current (DC) converter to convert the AC power source to a DC power supplied to a battery backup.

configuring a stepdown converter to step down a voltage output of the battery backup.

configuring the first and second outputs for operation at a same time.

Example Operating Environment

FIG. 8 is a block diagram of an example system 800 implementing aspects disclosed herein, and is designated generally as a system 800. The system 800 is but one example of a suitable computing environment and is not intended to suggest any limitation as to the scope of use or functionality of the examples disclosed herein. Neither should the system 800 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

The system 800 includes a bus 810 that directly or indirectly couples the following devices: a computer-storage memory 812, one or more processors 814, one or more presentation components 816, input/output (I/O) ports 818, I/O components 820, a power supply 822 (that includes the UPS 200), and a network component 824. While the system 800 is depicted as a seemingly single device, multiple systems 800 can work together and share the depicted device resources. For instance, the computer-storage memory 812 can be distributed across multiple devices, processor(s) 814 may provide housed on different devices, and so on.

The bus 810 represents one or more busses (such as an address bus, data bus, or a combination thereof). Although the various blocks of FIG. 8 are shown with lines for the sake of clarity, in reality, delineating various components is not so clear, and metaphorically, the lines would more accurately be grey and fuzzy. For example, a presentation component such as a display device can be considered to be an I/O component. Also, processors have memory and FIG. 8 is merely illustrative of an exemplary computing device that can be used in connection with one or more disclosed examples. Distinction is not made between such categories as "workstation," "server," "laptop," "hand-held device," etc., as all are contemplated within the scope of FIG. 8 and the references herein to a "system". The computer-storage memory 812 may take the form of the computer-storage media references below and operatively provide storage of computer-readable instructions, data structures, program modules and other data for the system 800. For example, the computer-storage memory 812 can store an operating system, a universal application platform, or other program modules and program data. The computer-storage memory 812 can be used to store and access instructions configured to carry out the various operations disclosed herein.

As mentioned below, the computer-storage memory 812 may include computer-storage media in the form of volatile and/or nonvolatile memory, removable or non-removable memory, data disks in virtual environments, or a combination thereof. And the computer-storage memory 812 may include any quantity of memory associated with or accessible by the computing device 800. The memory 812 may be internal to the computing device 800 (as shown in FIG. 8), external to the computing device 800 (not shown), or both (not shown). Examples of the memory 812 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 800. Additionally, or alternatively, the computer-storage memory 812 may be distributed across multiple computing devices 800, e.g., in a virtualized environment in which instruction processing is carried out on multiple devices 800. For the purposes of this disclosure, "computer storage media," "computer-storage memory," "memory," and "memory devices" are synonymous terms for the computer-storage memory 812, and none of these terms include carrier waves or propagating signaling.

Therefore, for example, a computer storage medium should not be interpreted to be a propagating signal per se. Propagated signals per se are not examples of computer storage media. Although the computer storage medium (the memory 812) is shown within the system 800, it will be appreciated by a person skilled in the art, that the storage can be distributed or located remotely and accessed via a network or other communication link (e.g. using a communication interface).

The processor(s) 814 may include any quantity of processing units that read data from various entities, such as the memory 812 or I/O components 820. Specifically, the processor(s) 814 are programmed to execute computer-executable instructions for implementing aspects of the disclosure. The instructions may be performed by the processor, by multiple processors within the computing device 800, or by a processor external to the client computing device 800. In some examples, the processor(s) 814 are programmed to execute instructions such as those illustrated in the flow charts discussed below and depicted in the accompanying drawings. Moreover, in some examples, the processor(s) 814 represent an implementation of analog techniques to perform the operations described herein. For example, the operations may be performed by an analog client computing device 800 and/or a digital client computing device 800. Presentation component(s) 816 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 800, across a wired connection, or in other ways. Ports 818 allow computing device 800 to be logically coupled to other devices including I/O components 820, some of which may be built in. Examples I/O components 820 include, for example but without limitation, a microphone, joystick, game pad, satellite dish, scanner, printer, wireless device, etc.

The system 800 may operate in a networked environment via the network component 824 using logical connections to one or more remote computers. In some examples, the network component 824 includes a network interface card and/or computer-executable instructions (e.g., a driver) for operating the network interface card. Communication between the computing device 800 and other devices may occur using any protocol or mechanism over any wired or wireless connection. In some examples, the network component 824 is operable to communicate data over public, private, or hybrid (public and private) using a transfer protocol, between devices wirelessly using short range communication technologies (e.g., near-field communication (NFC), Bluetooth™ branded communications, or the like), or a combination thereof. For example, network component 824 communicates over a communication link 826 with a network 828.

Although described in connection with an example system 800, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Any range or device value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The examples illustrated and described herein as well as examples not specifically described herein but within the scope of aspects of the claims constitute exemplary means for providing a UPS.

The term "comprising" is used in this specification to mean including the feature(s) or act(s) followed thereafter, without excluding the presence of one or more additional features or acts.

In some examples, the operations illustrated in the figures can be implemented as software instructions encoded on a computer readable medium, in hardware programmed or designed to perform the operations, or both. For example, aspects of the disclosure can be implemented as a system on a chip or other circuitry including a plurality of interconnected, electrically conductive elements.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An uninterruptible power supply (UPS) comprising:
    a rectifier configured to receive alternating current (AC) power;
    a first output provided by an inverter, the first output being configured to output AC power, the inverter receiving a first input from the rectifier and receiving a second input from a battery backup; and
    a second output that provides DC power to an external DC equipment in response to a detected power anomaly condition; and
    a stepdown converter configured to step down the DC power to output at the second output.

2. The UPS of claim 1, wherein the power anomaly condition comprises one of a power failure or an excess power condition.

3. The UPS of claim 1, wherein the stepdown converter converts DC voltage from a voltage of the battery backup to a voltage of the second output.

4. The UPS of claim 1, wherein the UPS is coupled within a rack and further comprising a power supply unit coupled within the rack, wherein the first output is connected to AC powered equipment in the rack and the second output is connected to a DC distribution bus bar, and the DC power is sourced to the DC distribution bus bar as a current shared power source with an output of the power supply unit during the power anomaly condition.

5. The UPS of claim 4, further comprising a first power supply line connected to the UPS and a second power supply line connected to the power supply unit.

6. The UPS of claim 1, wherein the first output is configured to operate in a high efficiency mode or a double conversion mode.

7. A dual output uninterruptible power supply (UPS) comprising:
    a first output;
    a second output that provides power to an external DC equipment in response to a detected power anomaly condition;
    a rectifier configured to convert input AC power to DC power supplied to a battery backup;
    an inverter configured to convert the DC power to AC power to output at the first output, wherein an output of the rectifier is connected to a first input of the inverter and an output of the battery backup is directly connected to a second input of the inverter; and
    a stepdown converter configured to step down the DC power to output at the second output.

8. The dual output UPS of claim 7, wherein the second output is activated in response to a power anomaly condition.

9. The dual output UPS of claim 8, wherein the second output is in an active state until one or more shut down operations of connected devices having random-access memory are completed.

10. The dual output UPS of claim 7, wherein the power anomaly condition comprises one of a power failure or excess power condition.

11. The dual output UPS of claim 7, wherein the UPS is coupled within a rack and further comprising a power supply unit coupled within the rack, wherein the first output is connected to AC powered equipment in the rack and the second output is connected to a DC distribution bus bar, and the DC power is sourced to the DC distribution bus bar as a current shared power source with an output of the power supply unit.

12. The dual output UPS of claim 11, further comprising a first power supply line connected to the UPS and a second power supply line connected to the power supply unit.

13. The dual output UPS of claim 7, wherein the first output is configured to operate in modes of operation that are different than modes of operation of the second output.

14. The dual output UPS of claim 7, wherein the first and second output are configured for selectable operation in a plurality of operating modes comprising a high efficiency mode of operation, a double conversion mode of operation, a second output backup power mode of operation, and a peak shaving mode of operation.

15. A method for providing an uninterruptible power supply (UPS), the method comprising:
    configuring a second output to provide DC power to an external DC equipment in response to a detected power anomaly condition;

configuring a rectifier to convert input AC power to DC power supplied to a battery backup;

configuring an inverter to convert the DC power from the rectifier to AC power to output a first output, wherein an output of the rectifier is connected to a first input of the inverter, and an output of the battery backup is directly connected to a second input of the inverter; and configuring a stepdown converter to step down the DC power to output at the second output.

16. The method of claim 15, wherein the power anomaly condition comprises one of a power failure or excess power condition.

17. The method of claim 15, further comprising configuring the first and second outputs to selectively operate in a plurality of operating modes comprising a high efficiency mode of operation, a double conversion mode of operation, a second output backup power mode of operation, and a peak shaving mode of operation.

18. The method of claim 15, further configuring an alternating current (AC)/direct current (DC) converter to convert the AC power to the DC power supplied to a battery backup.

19. The method of claim 15, further comprising configuring the stepdown converter to step down a voltage output of the battery backup.

20. The method of claim 15, further configuring the first and second outputs for operation at a same time.

\* \* \* \* \*